United States Patent [19]

Leppke et al.

[11] 4,199,798
[45] Apr. 22, 1980

[54] PHASE BALANCE MONITORING SYSTEM INCORPORATING VOLTAGE AND PHASE SEQUENCE MONITORING

[75] Inventors: Elton D. Leppke, Grafton; Russell P. Schuchmann, Milwaukee, both of Wis.

[73] Assignee: Eaton Corporation, Cleveland, Ohio

[21] Appl. No.: 886,299

[22] Filed: Mar. 13, 1978

[51] Int. Cl.² ............................................. H02H 3/26
[52] U.S. Cl. ...................................... 361/76; 324/86; 340/658; 340/663; 361/92
[58] Field of Search ............................. 361/76, 77, 92; 340/658, 661, 663; 307/127, 130; 324/86

[56] References Cited

U.S. PATENT DOCUMENTS

| | | |
|---|---|---|
| 3,535,591 | 10/1970 | Holmquist . |
| 3,539,868 | 11/1970 | Stevenson . |
| 3,648,112 | 3/1972 | Beckwith . |
| 3,699,441 | 10/1972 | Linders . |
| 3,848,160 | 11/1974 | Boothman . |
| 4,007,401 | 2/1977 | Kimmel et al. . |
| 4,060,843 | 11/1977 | Bost ........................................ 361/76 |

OTHER PUBLICATIONS

"Handbook of Operational Amplifier Active RC Networks", Burr-Brown Research Corp. 1966, pp. 27-31 and 74-75.

Primary Examiner—Harry E. Moose, Jr.
Attorney, Agent, or Firm—Hugh R. Rather; William A. Autio

[57] ABSTRACT

A phase unbalance detecting system that includes also low-voltage detection and wrong-phase-sequence detection. The system can be packaged in a small volume because it is a solid state type that uses a minimum of electronics and does not require transformers for obtaining signals from the several phases of the plural-phase power line but only one transformer for the D.C. power supply circuit for the detection system. The system incorporates means for allowing it to be used at 50 or 60 Hz without separate adjustment, for making it insensitive to noise and harmonics of the power line, and for providing a good estimate of the negative sequence voltage caused by a phase unbalance. It provides external terminals whereby it can be adapted for use at different power line voltages.

21 Claims, 6 Drawing Figures

PHASE BALANCE MONITORING SYSTEM INCORPORATING VOLTAGE AND PHASE SEQUENCE MONITORING

BACKGROUND OF THE INVENTION

Phase balance monitoring systems that respond to a phase unbalance condition and also to wrong-phase-sequence or low voltage conditions to protect a load device such as an A.C. motor have been known heretofore. However, these prior systems have had certain disadvantages among which are the following.

In prior null-balance systems wherein a null is achieved in a resistor-capacitor bridge network for a balanced set of three-phase vectors, phase unbalance is detected by the electrical signal produced upon a departure from such null condition to control a relay. In such systems, the null condition is affected not only by phase unbalance but also by frequency deviations of the line power as well as by harmonics and noise on the power line. Thus, different adjustments for a null are required for 50 or 60 Hz applications. Also, the increasing use of solid state motor drives and other power switching equipment has made the presence of electrical noise and harmonics on the power line a frequent application problem, particularly for lightly-loaded lines having power factor correction capacitors connected thereto, which capacitors can also cause tuning of the power system to a harmonic frequency. Such prior systems also typically use up to three transformers (for the bridge network and relay supply) which are bulky and require different sizes for different voltage applications. Moreover, such prior systems do not measure the true negative sequence voltage caused by the phase unbalance which would be desirable for an efficient system.

Variations of such prior null balance systems have also been known wherein the null balance is achieved in such a way that it is relatively insensitive to variations in the polyphase supply frequency and does measure the true negative sequence voltage caused by the unbalance, such as the system disclosed in J. R. Linders U.S. Pat. No. 3,699,441, dated Oct. 17, 1972. However, harmonics are still a problem unless additonal filtering is provided. Also, such systems typically require initial adjustment for 50 or 60 Hz applications and use two transformers that are bulky and must be selected for each different application voltage.

Other prior systems are of a type that develop D.C. voltages proportional to the respective phases of the monitored three-phase power line such as the system disclosed in D. R. Boothman et al U.S. Pat. No. 3,848,160, dated Nov. 12, 1974. Pairs of these voltages are then compared and the differences summed to determine the amount of phase unbalance. Such systems do not measure the true negative sequence voltage caused by the phase unbalance and besides are rather complex in that they involve a rather large amount of electronics along with transformers in each phase with their attendant disadvantages of bulkiness. Also to insure accuracy, either components with close tolerances must be used, or else, factory adjustments are required.

While these prior systems have been useful for their intended purposes, this invention relates to improvements thereover.

SUMMARY OF THE INVENTION

An object of the invention is to provide an improved phase balance monitoring system.

A more specific object of the invention is to provide an improved phase unbalance responsive system that incorporates low voltage responsive means.

Another specific object of the invention is to provide an improved phase unbalance responsive system that incorporates wrong-phase-sequence responsive means.

Another specific object of the invention is to provide an improved phase balance monitoring system that can be applied at 50 or 60 Hz without separate adjustment.

Another specific object of the invention is to provide an improved phase balance monitoring system that provides a signal that has good proportionality to the negative sequence voltage caused by the phase unbalance but does not require transformers for the phase of the power line.

Another specific object of the invention is to provide an improved phase balance monitoring system that provides a signal having good porportionality to the negative sequence voltage caused by the phase unbalance and is insensitive to noise and undesirable harmonics of the power line.

Another specific object of the invention is to provide an improved phase balance monitoring circuit that does not require transformers for the several phases but only one transformer for the circuit power supply and can be applied at different line voltages by changing external connections.

Another specific object of the invention is to provide an improved solid state unit of minimum complexity that advantageously includes three functions including phase balance, low voltage and phase sequence monitoring in one unit of small volume that can be applied 50 or 60 Hz without separate adjustment.

Other objects and advantages of the invention will hereinafter appear.

DESCRIPTION OF THE PREFERRED EMBODIMENT

Figure 1:
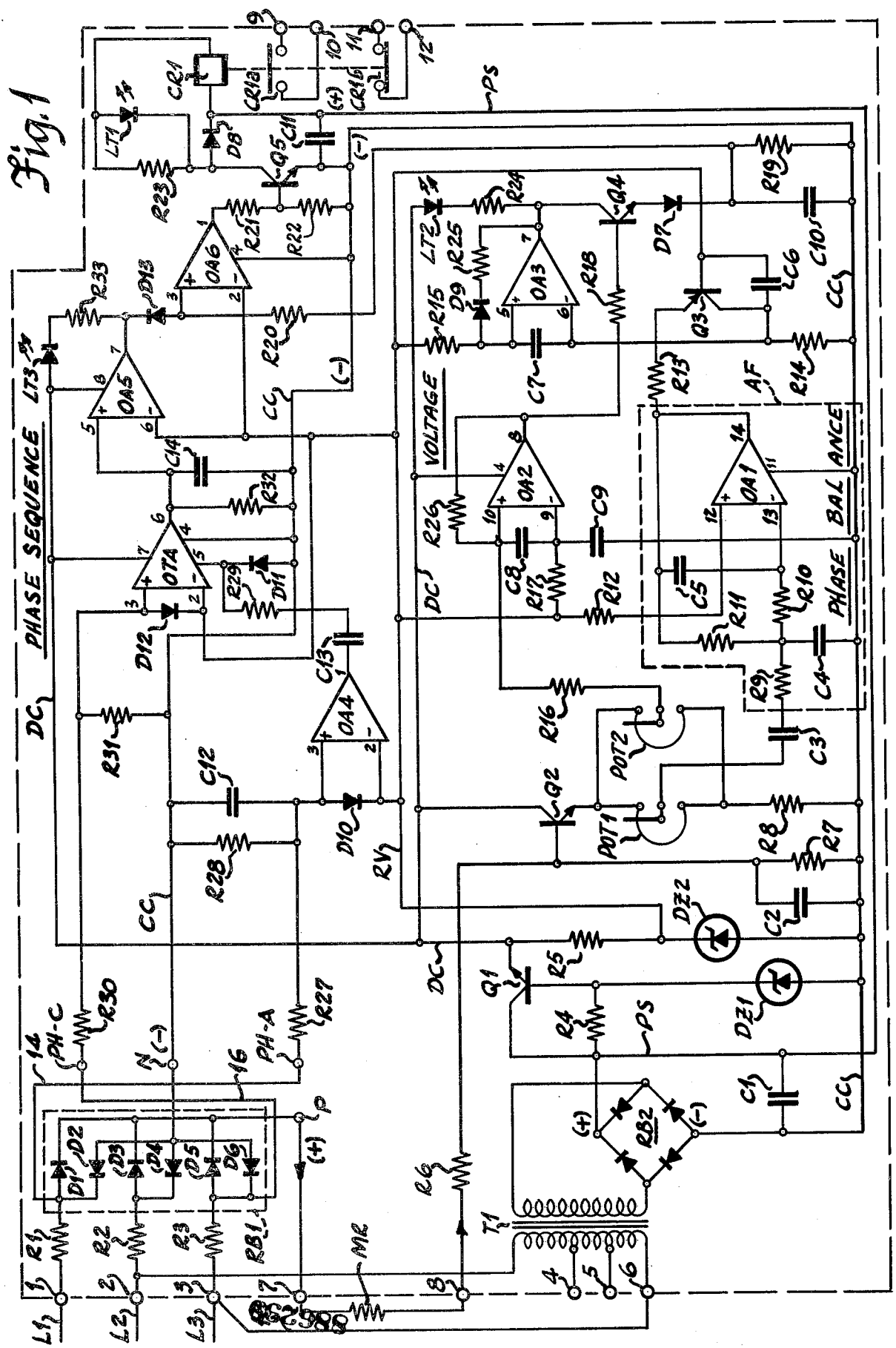
FIG. 1 is a circuit diagram showing a phase balance, low voltage and phase sequence monitoring system enclosed in dash-lines with its external connections outside this dash-line enclosure.
Figure 5:
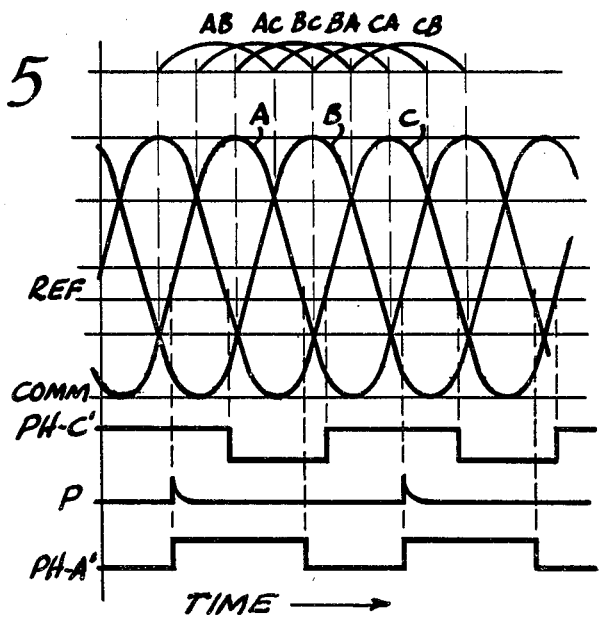
FIG. 5 is a graph showing correct-phase-sequence operating characteristics of the system of FIG. 1.
Figure 6:
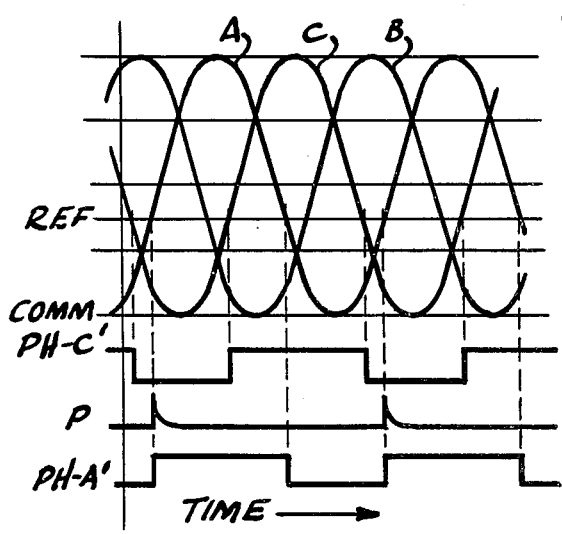
FIG. 6 is a graph showing wrong-phase-sequence operating characteristics of the system of FIG. 1.

Referring to FIG. 1, there is shown a phase balance monitoring system of the solid state type connected at terminals 1, 2 and 3 to lines L1, L2 and L3 of a three-phase power line that is to be monitored, and which supplies a load device such as a three-phase A.C. motor from a three-phase A.C. supply, these terminals 1, 2 and 3 representing the three phases A, B and C, respectively, of the power line as shown in FIGS. 5 and 6. Terminals 1, 2 and 3 are connected through series resistors R1, R2 and R3, respectively, and a three-phase full-wave rectifier bridge RB1 comprising diodes D1-D6 to positive and negative D.C. output terminals P and N, respectively. The phase A input to bridge RB1 is connected through conductor 14 to phase A terminal PH-A and the phase C input to bridge RB1 is connected through conductor 16 to phase C terminal PH-C for purposes hereinafter described. Positive output terminal P of the bridge is connected to external terminal 7 while negative terminal N of the bridge is connected to common conductor CC.

To supply D.C. operating power to the monitoring system, line terminals 2 and 3 are also connected across the primary winding of a transformer T1, terminal 2 being connected to one end of this primary winding and terminal 3 being selectively connected by an external jumper 18 to one of terminals 4, 5 or 6 which are connected to two taps and the other end of the primary winding to adapt the system for different line voltages as hereinafter described.

The secondary winding of transformer T1 is connected to the A.C. input terminals of a full-wave rectifier bridge RB2. The positive and negative D.C. output terminals of this rectifier bridge are connected to positive supply conductor PS and common conductor CC, respectively, with a smoothing capacitor C1 being connected thereacross. As will be apparent, this common conductor joins with common conductor CC leaving terminal N at the upper left-hand portion of the diagram. This positive supply conductor PS supplies D.C. power to the coil circuit of control relay CR1 at the upper right-hand portion of the diagram.

To provide regulated D.C. supply voltage to the monitor system, positive voltage supply conductor PS is connected through the collector and emitter of a regulating transistor Q1 to supply conductor DC. Conductor PS is also connected through a resistor R4 and a zener diode ZD1 to common conductor CC with the junction therebetween being connected to the base of transistor Q1. As a result, current flows from the positive output of bridge RB2 through resistor R4 and zener diode ZD1 to provide a constant voltage at the base of transistor Q1. This regulates the conduction of transistor Q1 to provide a regulated D.C. voltage on conductor DC from where it is applied through several branches to various parts of the monitoring circuit as hereinafter described.

In order to monitor the functioning of the three-phase line, there is provided a reference voltage against which phase balance, voltage amplitude and phase sequence signals are compared. For this purpose, a reference voltage circuit comprising a resistor R5 and a zener diode ZD2 in series is connected from supply conductor DC to common conductor CC. The junction between this resistor and zener diode is connected to reference voltage conductor RV which has a number of branches as hereinafter described.

Operational amplifiers OA1, OA2, OA3 and OA4 are on a four-amplifier integrated circuit. For this reason, the positive voltage connection from conductor DC to amplifier OA2 and the negative voltage connection from common conductor CC to amplifier OA1 may be regarded as supplying D.C. power to all four operational amplifiers on the IC (integrated circuit) chip.

In a similar manner, operational amplifiers OA5 and OA6 are on a two amplifier IC and the positive voltage connection from conductor DC to amplifier OA5 and the negative voltage connection from common conductor CC to amplifier OA6 may be regarded as supplying D.C. power to both amplifiers on this IC chip.

Operational transconductance amplifier OTA receives DC supply voltage at its terminals 7 and 4 from conductors DC and CC, respectively. This operational transconductance amplifier differs from the other six operational amplifiers in that it has an amplifier bias input terminal 5 to which a pulse is applied for gating the amplifier during phase sequence monitoring as hereinafter described.

Generally, the phase balance monitoring circuit is shown at the lower portion of the diagram in FIG. 1 and includes operational amplifier OA1 and its associated elements. The voltage monitoring circuit is shown at the middle of the diagram and includes operational amplifier OA2 and its associated elements. And the phase sequence monitoring circuit is shown at the top of the diagram and includes operational transconductance amplifier OTA and its associated elements. The remainder of the circuit elements will be identified and described along with the following description of operation of the system.

For both phase balance and voltage monitoring purposes, a voltage is taken from the three-phase line for comparison with the aforementioned reference voltage appearing on conductor RV. For this purpose, the output voltage from the three-phase rectifier bridge is taken at terminal P and applied through terminal 7, multiplier resistor MR, terminal 8 and voltage divider resistors R6 and R7 to common conductor CC, with the voltage at the junction between the latter two resistors being applied to the base of transistor Q2. A transient or noise suppressor capacitor C2 is connected across resistor R7. Resistor MR is called a multiplier resistor in the ordinary sense because this resistor may have various resistance values for application of the monitoring system to different line voltages. These external terminals 7 and 8 facilitate connection of the required value of multiplier resistor to accommodate the particular line voltage. Also in conjunction therewith, jumper 18 is connected from terminal 3 to the appropriate terminal 4, 5 or 6 depending on the value of the line voltage so as to adapt the monitoring system in a number of steps to a range of line voltages from about 200 volts to about 600 volts, for example.

Application of such divided voltage from the junction between resistors R6 and R7 to the base causes transistor Q2 to conduct, current flowing from conductor Dc through its collector and emitter and then through potentiometers POT1 and POT2 in parallel and resistor R8 to common conductor CC.

Potentiometer POT1 supplies a signal for phase unbalance detection whereas potentiometer POT2 supplies a signal for low voltage detection.

Figure 2:
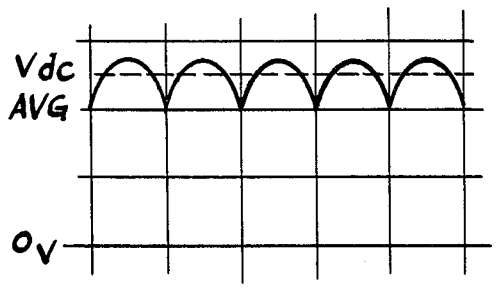
FIG. 2 is a graph showing a rectified three-phase voltage when the three phases of the power line are balanced.

Phase unbalance detection will be described first. Full-wave rectification of balanced three-phase power will provide a voltage wave form as that shown in solid lines in FIG. 2. This voltage has a D.C. level which represents the average voltage Vdc of the three phases as shown by a dotted line along with ripple which has as its lowest frequency component the sixth harmonic of the line frequency. This average voltage is useful as a measure of the magnitude of the line voltage.

Figure 3:
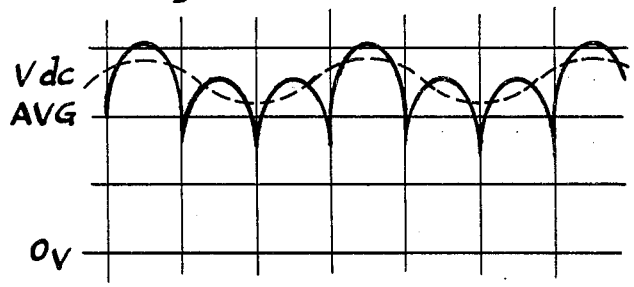
FIG. 3 is a graph showing the rectified voltage for an unbalanced three-phase line voltage for comparison with FIG. 2 where the three phases of the power line are balanced.

If, however, the phases are unbalanced, this causes a change in the wave form and the result is shown in solid lines in FIG. 3. Here again, the D.C. level is proportional to the average of the three phases but the ripple voltage now includes a second harmonic component as shown in broken line. The amplitude of this second harmonic is a good measure of the phase unbalance. Therefore, if a filter is provided to remove the sixth harmonic, the filter output will be proportional to phase unbalance.

Figure 4:
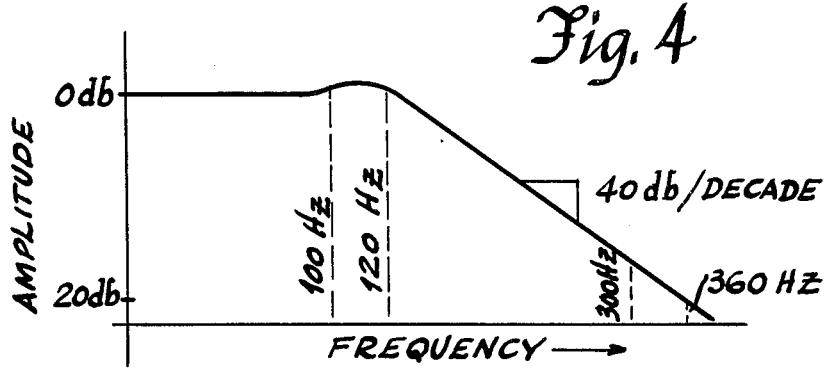
FIG. 4 is a graph showing the function of the active filter circuit enclosed in broken lines in FIG. 1.

Moreover, by properly shaping the filter response, as shown in FIG. 4, the attenuation at 100 Hz and 120 Hz, the second harmonics of 50 Hz and 60 Hz, respectively, can be made the same. Consequently, this allows the unbalance monitor to be applied at either 50 Hz or 60 Hz without adjustment. FIG. 4 shows, in addition to the suitable filter response at 50 Hz and 60 Hz, substantial attenuation at the sixth harmonics (300 Hz and 360 Hz for frequencies of 50 and 60 Hz) and for high harmonics. This leaves only the second harmonic which is the desired indicator of phase unbalance.

These principles are applied in a practical way in the circuit of FIG. 1. Only one transformer T1 is required, that being for the monitoring circuit power supply. Transistor Q2 provides a low impedance output from the voltage divider comprising resistors R6 and R7. As hereinbefore mentioned, potentiometer POT1 provides a signal for phase unbalance detection and potentiometer POT2 provides a signal for low voltage detection. These potentiometers provide fine calibration adjustment of such signals.

The phase unbalance monitoring signal is taken from the movable tap of potentiometer POT1 and applied through an A.C. coupling capacitor C3 to an active filter circuit AF. As shown in FIG. 1, this active filter AF comprises operational amplifier OA1, three resistors R9, R10 and R11 and two capacitors C4 and C5 and is a low pass multiple-feedback active filter having a response as shown in FIG. 4. A filter of this type is disclosed in Chapter 3, FIG. 3-3 of Handbook of Operational Amplifier Active RC Networks, First Edition, 1966, Burr-Brown Research Corporation. As shown in FIG. 4, this filter passes 50 Hz and 60 Hz second harmonic waves but does not pass the sixth harmonic waves of 300 and 360 Hz. As shown in FIG. 1, the aforementioned reference voltage is applied from conductor RV through resistor R12 to the non-inverting input of amplifier OA1 whereas the phase unbalance signal is applied to its inverting input. The filtered output, which is proportional to phase unbalance, is rectified and referenced to common conductor CC by means of the circuit of transistor Q3. For this purpose, this filtered output is applied through resistor R13 to the emitter of transistor Q3. The aforementioned reference voltage is applied from conductor RV to the base of transistor Q3. It will be apparent that if the filtered output voltage from active filter AF that is applied to the emitter of transistor Q3 is higher than the reference voltage applied to its base, transistor Q3 will conduct with rectified current flowing through resistor R14 to common conductor CC. On the other hand, when the emitter voltage is not above the base voltage, transistor Q3 will not conduct.

Operational amplifier OA3 compares the rectified phase unbalance signal voltage appearing on resistor R14 to the reference voltage to establish the phase unbalance trip point. Normally, when there is no phase unbalance or when the phase unbalances is insufficient to trip, that is, deenergize, control relay CR1, the reference voltage is applied from conductor RV through resistor R15 to non-inverting terminal 5 of amplifier OA3. This voltage is higher than the voltage at inverting terminal 6 and causes amplifier OA3 to provide a positive output voltage to the collector of transistor Q4. Capacitors C6 and C7 suppresses any ripple on the input voltages applied to amplifier OA3.

To enable transistor Q4 to conduct and energize control relay CR1, it must receive a voltage to its base also. This is obtained from the low voltage detecting circuit. For this purpose, when the line voltage is not low, a voltage is applied from the movable wiper of potentiometer POT2 through resistor R16 to non-inverting input 10 of operational amplifier OA2. This voltage is higher than the reference voltage applied from conductor RV through resistor R17 to inverting input 9 thereby causing amplifier OA2 to apply a positive output voltage through resistor R18 to the base of transistor Q4. Capacitors C8 and C9 suppress any ripple in these input voltages to amplifier OA2.

Transistor Q4 now has voltage applied to both its collector and base as aforesaid and will conduct, current flowing from the amplifier output through transistor Q4, blocking diode D7 and an RC time delay circuit including resistor R19 and capacitor C10 in parallel to common conductor CC. The voltage across resistor R19 is applied through resistor R20 to the non-inverting input 3 of operational amplifier OA6 causing an output from the latter to be applied through resistors R21 and R22 to common conductor CC. The voltage drop across resistor R22 applied to the base-emitter junction causes transistor Q5 to conduct and to energize the coil of control relay CR1. For this purpose, current flows from positive conductor PS through the coil of relay CR1, resistor R23 and light emitting diode LT1 in parallel, and power transistor Q5 to common conductor CC. As a result, relay CR1 operates its contacts CR1a and Cr1b and light emitting diode LT1 is lit to indicate that relay CR1 is energized. Diode D8 connected across the relay coil and the parallel circuit of indicator LT1 and resistor R23 is poled to conduct current in response to the induced voltage of the relay coil when the relay is "tripped," that is, when transistor Q5 is turned off. A small capacitor C11 connected across conductors PS and CC adjacent output transistor Q5 suppresses high frequency noise.

Assuming now that there is a phase unbalance of predetermined magnitude on the three-phase line, such as to cause control relay CR1 to trip, the output of active filter AF increases to cause increased conduction of transistor Q3 with larger current flow through resistor R14. This raises the voltage on inverting input 6 above the reference voltage on noninverting input 5, thus causing the output of amplifier OA3 to drop negative. This negative voltage on the collector turns transistor Q4 off. As a result, capacitor C10 discharges through resistor R19 for a time delay. This time delay of 3 seconds, for example, prevents the control relay from tripping in response to transients. Diode D7 prevents capacitor C10 from discharging through transistor Q4. When capacitor C10 discharges enough, the voltage on non-inverting input 3 of amplifier OA6 drops below the reference voltage on its inverting input 2 coming from conductor RV to cause the output of this amplifier to go negative. This causes transistor Q5 to turn off and to trip control relay CR1 and restore its contacts. Referring back now to amplifier OA3, current flows from supply conductor DC through light emitting diode LT2 and resistor R24 into the negative output of amplifier OA3 to light the diode and indicate that the control relay has tripped due to unbalanced line voltage or phase unbalance.

Diode D9 and resistor R25 connected in series from the non-inverting input to the output of amplifier OA3 provide an hysteresis effect or differential between trip and reset in amplifier operation. That is, when the amplifier output goes negative in response to the voltage on its inverting input rising above a given value, the voltage on its inverting input must now drop a predetermined amount below such given value in order for the amplifier output to go positive again. This comes about by current flow through diode D9 and resistor R25, which current also flows through resistor R15 to drop the voltage on non-inverting input 5.

Alternatively, a low voltage condition on the three-phase line will cause the control relay to trip. For this purpose, let it be assumed that there is no phase unbalance and that transistor Q4 is conducting as hereinbefore described. It will be apparent that transistor Q4 is in effect an OR logic device in that it normally conducts and can be turned off at its collector by a phase unbalance as hereinbefore described or can be turned off at its base by a low voltage condition as hereinafter described.

Assuming that the average voltage on the three-phase line drops below a predetermined value, the voltage at non-inverting input 10 of amplifier OA2 falls below the reference voltage at its inverting input 9. As a result, the output of amplifier OA2 goes negative to turn transistor Q4 off at its base. This causes control relay CR1 to trip, that is, to be deenergized as hereinbefore described to restore its contacts to their normal positions shown. Low voltage tripping or no voltage present is indicated by neight light emitting diode LT1, LT2 or LT3 being lit when the relay is tripped.

Resistor R26 provides two-way hysteresis or differential for amplifier OA2 between trip and reset. When the output of this amplifier goes negative as just described, current flows through resistor R26 from left to right. Since this current also flows through resistor R16, this causes a drop in the voltage at non-inverting terminal 10. As a result of this, the line voltage must rise higher than its low voltage trip value before the output of amplifier OA2 will go positive again.

And again when the line voltage rises high enough to cause the output of amplifier OA2 to go positive again, current flow through resistor R26 ceases causing a jump in the voltage at non-inverting input 10 to insure positive re-energization of the control relay. This hysteresis effect prevents amplifier OA2 from hovering at the trip point where it might turn the control relay off and on intermittently.

The function of the phase sequence monitoring circuit at the upper portion of FIG. 1 will now be described in conjunction with the graphs of FIGS. 5 and 6.

Operational transconductance amplifier OTA receives positive operating voltage from conductor DC to its terminal 7 whereas its terminal 4 is connected to common conductor CC. This amplifier has differential input terminals including inverting input 2 and non-inverting input 3, and an output terminal 6. In addition, this amplifier has a gain control terminal 5 which controls the amplifier output in accordance with signals at the differential inputs. Generally, if a current pulse is applied to gain control or bias terminal 5 while input 3 is positive with respect to input 2, the amplifier output will be a positive current pulse. On the other hand, if the current pulse to gain control terminal 5 is applied while input 3 is negative with respect to input 2, the amplifier output will be pulsed negative.

Referring now to FIG. 1, it will be seen that of the three-phase line voltage phases A, B and C, a phase A voltage is applied from terminal PH-A through divider resistors R27 and R28 to conductor CC with their junction being connected to non-inverting input 3 of operational amplifier OA4 while the reference voltage from conductor RV is applied to inverting input 2 of this amplifier. A capacitor C12 across resistor R28 suppresses electrical noise. A diode D10 connected across the inputs of amplifier OA4 limits the voltage of input 3 to one diode drop above the voltage of the reference voltage at input 2 and thus makes this portion of the system operable at, and insensitive to variation or change to, different line voltages. As a result, amplifier OA4 provides an output that is a rectangular wave form PH-A' shown in FIG. 5. This rectangular wave form goes positive whenever phase A voltage exceeds the reference voltage as shown in FIG. 5. The leading edge of this rectangular wave is differentiated by capacitor C13 and resistor R29 connected in series to provide a pulse P of current shown in FIG. 5 that is applied to gain control input 5 of amplifier OTA. Diode D11 connected from common conductor CC to input 5 of amplifier OTA suppresses the negative pulse that would otherwise occur at the end of rectangular wave PH-A' in FIG. 5.

Also for phase sequence monitoring purposes, a phase C voltage is applied from terminal PH-C through voltage divider resistors R30 and R31 to common conductor CC with their junction being connected to non-inverting input 3 of amplifier OTA. The reference voltage is connected from conductor RV to inverting input 2 of amplifier OTA. Diode D12 connected from input 3 to input 2 limits the phase C voltage of input 3 to one diode drop above the reference voltage to make this portion of the system insensitive to different line voltages. Curve PH-C' in FIG. 5 shows when input 3 is positive with respect to the reference voltage at input 2.

When the phases of the line voltage are in the correct sequence A-B-C as shown in FIG. 5, current pulse P occurs at the time that non-inverting input 3 of amplifier OTA is driven positive by phase C of the line. As a result, the amplifier output 6 will supply a current pulse to integrating capacitor C14 charging it to a positive voltage. Resistor R32 connected across capacitor C14 forms a timed discharge current path for this integrating capacitor. The repeated current pulses will build up the voltage on integrating capacitor C14, causing the voltage on non-inverting input 5 of operational amplifier OA5 to exceed the reference voltage applied from conductor RV to its inverting input 6. As a result, a positive voltage from output 7 blocks diode D13, thus allowing the positive voltage from resistor R19 to keep amplifier OA6 turned on to keep output transistor Q5 conducting and the control relay energized.

If the phases of the three-phase line voltage should be connected in wrong sequence such as A-C-B as shown in FIG. 6, control relay CR1 will not energize. The phase A rectangular wave PH-A' will again be developed at the output of amplifier OA4 and the leading edges thereof will be differentiated to provide pulses P that are applied to gain control input 5 of operational transconductance amplifier OTA as hereinbefore described. In view of this wrong phase sequence condition, it will be seen in FIG. 6 that pulses P do not occur at the times when non-inverting input 3 of amplifier OTA is driven positive by rectangular wave PH-C'. Instead, input 3 is negative during the time that pulses P are applied as shown in FIG. 6. The reference voltage at input 2 will cause the output of amplifier OTA to go negative and to discharge integrating capacitor C14 with a short time delay such as 100 milliseconds. This will cause input 5 of amplifier OA5 to drop less positive than input 6 and to cause the output thereof to go negative. This negative output of amplifier OA5 will do two things. It will cause input 3 of amplifier OA6 to fall less positive than input 2 resulting in a negative output to turn transistor Q5 off and trip the control relay. This is because current as a result of the voltage on resistor R19 will be shunted through diode D13 into the negative output of amplifier OA5 which causes the voltage at input 3 of amplifier OA6 to decrease. It will also cause current flow from conductor DC through light emitting diode LT3 and resistor R33 into the negative output of amplifier OTA. Diode LT3 lights to indicate the tripping of the control relay due to wrong phase sequence.

When the phase sequence is corrected, of course, the control relay will be reset into energized condition.

While the apparatus hereinbefore described is effectively adapted to fulfill the objects stated, it is to be understood that the invention is not intended to be confined to the particular preferred embodiment of phase balance monitoring system incorporating voltage and phase sequence monitoring disclosed, inasmuch as it is susceptible of various modifications without departing from the scope of the appended claims.

We claim:

1. An electrical system for protecting a a load device against change in parameters of a polyphase A.C. supply circuit comprising:
   a polyphase A.C. supply circuit connected to the load device;
   a monitoring circuit comprising an output circuit normally controlling application of power from said polyphase A.C. supply circuit to said load device;
   said monitoring circuit comprising:
   signal developing means comprising:
   means for deriving a first pair of signals from said polyphase A.C. supply circuit for comparison, one of said signals being indicative of a parameter of said polyphase A.C. supply circuit to be monitored and being variable with variation in said parameter, and the other signal being a reference signal uniform in character;
   a signal comparator and output control means responsive to said signals when said variable signal has a value relative to said uniform signal indicative of a normal condition of said parameter for controlling said output circuit to maintain power on said load device;
   said signal comparator and said output control means being responsive to said signals when said variable signal reaches a value relative to said uniform signal indicative of a significant variation in said parameter that might be hazardous to said load device for tripping said output circuit to interrupt power from said load device;
   means for developing a second pair of signals from said polyphase A.C. supply circuit indicative of two phases thereof;
   means for converting one of said phase signals to a gating signal having a coincident or non-coincident relation to the other phase signal according to whether the phases of said polyphase A.C. supply circuit have correct or incorrect phase sequence;
   means comprising gating means responsive to said gating signal being coincident with said other phase signal for providing a control signal and means responsive to said control signal for controlling said output circuit to maintain power on said load device provided said signal comparator and said output control means have not tripped the same;
   and said means comprising gating means being responsive to said gating signal being non-coincident with said other phase signal for tripping said output circuit to interrupt power from said load device regardless of any concurrent maintaining action of said signal comparator and output control means.

2. The electrical system claimed in claim 1, wherein: said one signal is proportional to phase unbalance in said polyphase A.C. supply circuit.

3. The electrical system claimed in claim 1, wherein: said one signal is proportional to a low voltage condition in said polyphase A.C. supply circuit.

4. The electrical system claimed in claim 1, wherein: said means responsive to said control signal for controlling said output circuit comprises:
   a current integrator-voltage discharge circuit operable by the periodic coincident between said gating signal and said other phase signal for providing a voltage that controls said output circuit to maintain power on said load device;
   and said current integrator-voltage discharge circuit being responsive to non-coincidence between said gating signal and said other phase signal to discharge said voltage thereby to cause said output circuit to trip.

5. The electrical system claimed in claim 1, wherein: said signal developing means also comprises means for deriving a fifth signal from said polyphase A.C. supply circuit which is indicative of a low voltage condition for comparison with said other signal of said first pair thereof;
   and said one signal of said first pair of signals being indicative of a phase unbalance in said polyphase A.C. supply circuit whereas said other signal of said first pair is a constant reference signal.

6. The electrical system claimed in claim 4, wherein: said means responsive to said control signal for controlling said output circuit also comprises:
   a voltage comparator responsive to said voltage from said current integrator-voltage discharge circuit as compared to said reference signal for providing an output signal to control said output circuit.

7. A monitoring system for protecting a load device against excessive changes in the parameters of a three-phase A.C. supply comprising:
   a three-phase A.C. power circuit;
   a parameter monitoring circuit comprising:
   phase unbalance monitoring means comprising:
   means for rectifying the three-phase voltage of said A.C. power circuit;
   means for filtering the rectified three-phase voltage to pass only that harmonic voltage whose amplitude is substantially proportional to phase unbalance in the three-phase voltages;
   means for developing a reference voltage;
   means for rectifying said harmonic voltage to provide a control voltage;

an output circuit;
and a voltage comparator responsive to said control voltage when it varies with respect to said reference voltage by a predetermined excessive amount to a trip value for tripping said output circuit to control supply of the three-phase A.C. to the load device.

8. The monitoring system claimed in claim 7, wherein:
said means for filtering the rectfied three-phase voltage comprises a low pass filter that passes only the second harmonic of the three-phase A.C. voltage that is substantially proportional to the phase unbalanced in the three-phase A.C. voltages.

9. The monitoring system claimed in claim 7, wherein:
said means for filtering the rectified three-phase voltage comprises a low pass multiple feedback active filter that passes only the second harmonic of the three-phase A.C. voltage that is a good measure of the phase unbalance and attenuates 100 Hz and 120 Hz voltages equally which are second harmonics of 50 Hz and 60 Hz power frequencies thereby to afford application thereof to 50 Hz and 60 Hz systems without adjustment.

10. The monitoring system claimed in claim 7, wherein:
said means for rectifying said harmonic voltage to provide a control voltage comprises a transistor controlled by said reference voltage and said harmonic voltage to provide said control voltage with reference to ground for application to said voltage comparator.

11. The monitoring system claimed in claim 7, wherein:
said parameter monitoring circuit also comprises external terminals between said three-phase voltage rectifying means and said filtering means, and a multiplier resistor of selected value connected to said external terminals for adapting the monitoring system to a predetermined supply voltage.

12. The monitoring system claimed in claim 7, wherein:
said voltage comparator comprises a differential circuit effecting current flow upon said response of said voltage comparator to modify one of the input voltages thereto a given amount whereby said control voltage must return said given amount beyond said trip value in order to terminate operation of said voltage comparator.

13. The monitoring system claimed in claim 7, wherein:
said parameter monitoring circuit also comprises means for developing a voltage signal proportional to the supply voltage amplitude;
and a second voltage comparator responsive to said voltage signal when it decreases to a predetermined trip voltage value relative to said reference voltage for operating said output circuit.

14. The monitoring system claimed in claim 13, wherein:
said second voltage comparator comprises a shunt resistor providing two-way differential whereby current flows through said resistor upon response of said second voltage comparator to a voltage signal of predetermined trip value for allowing restoration of said voltage comparator only upon said voltage signal rising a predetermined amount above said trip value.

15. The monitoring system claimed in claim 13, wherein:
said output circuit comprises an OR logic circuit responsive to either the output of said first or second voltage comparator for operating said output circuit to control supply of the three-phase A.C. to the load device.

16. The monitoring system claimed in claim 7, wherein said parameter monitoring circuit also comprises:
phase sequence monitoring means comprising:
means responsive to the voltage of one phase of said three-phase A.C. supply and to said reference voltage for developing a periodic rectangular voltage wave;
means responsive to the voltage of another phase of said three-phase A.C. supply and to said reference voltage for developing periodic voltage pulses;
said one phase and said other phase being selected so that when the three phases of the A.C. supply are in one sequence said pulses occur during said rectangular waves and when the three phases are in the other sequence said pulses occur in the intervals between said rectangular waves;
gating means responsive to said rectangular waves and said pulses for providing first and second signals according to whether said pulses occur during or between said rectangular waves;
and a second comparator responsive to said first and second signals for operating said output circuit when the three phases are in a predetermined sequence and for preventing operation of said output circuit when the three phases are not in said predetermined sequence.

17. The monitoring system claimed in claim 16, wherein:
said means for developing said periodic rectangular voltage wave and said means for developing said periodic voltage pulses comprise means for rendering the same insensitive to supply voltage variations.

18. The monitoring system claimed in claim 16, wherein means for developing periodic voltage pulses comprises:
means responsive to the voltage of said other phase and said reference voltage for developing a second periodic rectangular wave;
means for differentiating one edge of said second rectangular wave to provide said periodic voltage pulses;
and means for suppressing the other differentiated edge of said second rectangular wave.

19. The monitoring system claimed in claim 16, wherein said parameter monitoring circuit also comprises:
low voltage monitoring means comprising:
means responsive to said rectified three-phase voltage for developing a supply voltage amplitude indicative signal;
and a third voltage comparator responsive to said amplitude indicative signal when it drops to a low voltage value relative to said reference signal for providing a trip signal to said output circuit to cause tripping of the latter.

20. The monitoring system claimed in claim 19, wherein said parameter monitoring means also comprises:

a plurality of visual indicator means connected thereto for indicating by their electrical states which of the respective different monitoring means caused the tripping or non-operation of said output circuit.

21. The monitoring system claimed in claim 20, wherein said plurality of visual indicator means comprises:

a first electrical light element connected to said phase unbalance monitoring means and responsive to said first voltage comparator for indicating the tripping of said output circuit;

a second electrical light element connected to said phase sequence monitoring means and responsive to said second voltage comparator for indicating the non-operation of said output circuit;

and a third electrical light element connected to said output circuit and responsive to normal operation therefor for indicating such normal operation;

whereby a state of all three electrical light elements being out is indicative of a low voltage condition or no voltage condition.

* * * * *